(12) United States Patent
Murakami et al.

(10) Patent No.: US 7,126,886 B2
(45) Date of Patent: Oct. 24, 2006

(54) MAGNETO-OPTICAL RECORDING MEDIUM AND METHOD FOR PRODUCING THE SAME

(75) Inventors: Motoyoshi Murakami, Hirakata (JP); Masahiro Birukawa, Hirakata (JP); Tsutomu Shiratori, Tokyo (JP); Yasuyuki Miyaoka, Yokohama (JP)

(73) Assignees: Matsushita Electric Industrial Co., Ltd., Osaka (JP); Canon Kabushiki Kaisha, Tokyo (JP)

( * ) Notice: Subject to any disclaimer, the term of this patent is extended or adjusted under 35 U.S.C. 154(b) by 642 days.

(21) Appl. No.: 10/123,894

(22) Filed: Apr. 16, 2002

(65) Prior Publication Data
US 2003/0058751 A1   Mar. 27, 2003

(30) Foreign Application Priority Data
Apr. 19, 2001   (JP) ............................. 2001-120687

(51) Int. Cl.
*G11B 11/10* (2006.01)
(52) U.S. Cl. ............................. 369/13.47; 369/132.52; 369/13.24
(58) Field of Classification Search ............ 369/13.24, 369/13.26, 13.46, 13.47, 13.42, 275.2, 275.3, 369/13.07, 30.05, 13.08, 13.52, 116, 13.44, 369/13.06, 13.02; 428/141, 694 MM, 900, 428/64.3; 427/128, 129, 130
See application file for complete search history.

(56) References Cited

U.S. PATENT DOCUMENTS 5,018,119 A * 5/1991 Aratani et al. ........... 369/13.46
5,867,455 A * 2/1999 Miyamoto et al. ........ 369/30.05
5,909,410 A * 6/1999 Awano et al. ............ 369/13.07
5,966,348 A   10/1999 Hashimoto et al. ...... 369/13.47
6,027,825 A   2/2000 Shiratori et al. ......... 369/13.46
6,177,175 B1 * 1/2001 Hashimoto ................. 428/141
6,221,219 B1 * 4/2001 Hashimoto et al. ...... 369/13.42
6,403,148 B1 * 6/2002 Shiratori et al. ............ 427/128
6,430,116 B1 * 8/2002 Kawano et al. .......... 369/13.45
6,608,799 B1 * 8/2003 Hozumi .................... 369/13.26

FOREIGN PATENT DOCUMENTS

| JP | 6-290496 | 10/1994 |
| JP | 8-147777 | 6/1996 |
| JP | 10-91938 | 4/1998 |
| JP | 11-126381 | 5/1999 |
| JP | 11-126386 | 5/1999 |

* cited by examiner

*Primary Examiner*—William Korzuch
*Assistant Examiner*—Kim-Kwok Chu
(74) *Attorney, Agent, or Firm*—Hamre, Schumann, Mueller & Larson, P.C.

(57) ABSTRACT

According to the present invention, a light beam is radiated to an area between recording tracks while the intensity of a magnetic field from the outside to a magneto-optical recording medium is suppressed to 50 Oe or less, whereby magnetic anisotropy formed between the recording tracks is set to be lower than that of the magnetic layer on the recording tracks, and micro-domains, for example, having a diameter smaller than a half-width of a light beam for reproduction in a film surface direction are formed on recording tracks. Because of this method, the influence of a leakage magnetic field in the magneto-optical recording medium adopting a DWDD reproducing system is alleviated.

5 Claims, 8 Drawing Sheets

MAGNETO-OPTICAL RECORDING MEDIUM AND METHOD FOR PRODUCING THE SAME

BACKGROUND OF THE INVENTION

1. Field of the Invention

The present invention relates to a magneto-optical recording medium used for recording or reproducing information, a method for producing the same, and an apparatus for producing the same.

2. Description of the Related Art

As a repeatedly rewritable recording medium having a high density, a magneto-optical recording medium and a recording/reproducing apparatus for recording a minute domain onto a magnetic thin film with thermal energy of laser light, and reproducing a signal using a magneto-optical effect are being developed actively. In such a magneto-optical recording medium, when the diameter and interval of recording bits (domains for recording) become smaller with respect to the diameter of a light beam focused onto the medium, reproduction characteristics are degraded. This is caused as follows: an adjacent recording bit enters the diameter of a light beam focused onto an intended recording bit, which makes it difficult to reproduce information from individual recording bits separately.

In order to solve the above-mentioned problem, attempts have been made to enhance a recording density by modifying the configuration of a recording medium and a reproducing method. For example, a super-resolution system, a domain wall displacement detection (DWDD) reproducing system using the displacement of a domain wall, and the like have been proposed. Herein, a DWDD reproducing system disclosed in JP6(1997)-290496 A will be described with reference to FIG. 9.

In a magneto-optical recording medium shown in FIG. 9, a reproducing layer (domain wall displacement layer) 91, an intermediate layer (switching layer) 92, and a recording layer 93 that constitute magnetic layers 90 are exchange-coupled to each other, and a minute recording domain 96 of the recording layer 93 is enlarged in the reproducing layer 91, whereby an amplitude of a reproducing signal is increased, making it possible to conduct high-density recording. Arrows represent the sublattice magnetization directions of transition metal in each layer. In each layer, a domain wall 94 is formed between domains in which magnetization directions are opposite to each other. A region 95 of the intermediate layer 92 reaches a temperature equal to or higher than a Curie temperature due to the irradiation with laser light for reproduction, whereby a magnetic order is lost.

The conditions desired for the above-mentioned magneto-optical recording medium are summarized by the following four points:

(1) The magneto-optical recording medium has the recording layer 93 that holds minute domains stably in a range from a room temperature to a reproducing temperature.

(2) Even when the magneto-optical recording medium is heated to the vicinity of a Curie temperature of the intermediate layer 92, the reproducing layer 91, the intermediate layer 92, and the recording layer 93 are exchange-coupled to each other.

(3) When the intermediate layer 92 reaches a temperature exceeding its Curie temperature so as to lose its magnetic order, exchange coupling between the recording layer 93 and the reproducing layer 91 is cut off.

(4) The domain wall coercive force of the reproducing layer 91 is small, and a domain wall energy gradient is caused by a temperature gradient. Therefore, in a region of the reproducing layer 91 where exchange coupling is cut off by the intermediate layer 92, the domain wall 94 is displaced from a position transferred from a domain of the recording layer 93. As a result, the magnetization in this region is aligned in the same direction, and an interval (recording mark length) between the magnetic walls 94 of the recording layer 93 is enlarged.

In FIG. 9, when the magneto-optical recording medium is moved (rotated in the case of a disk) in the right direction on the drawing surface while laser light is radiated thereto, due to the high linear velocity of the medium, the position at which a film temperature becomes maximum is placed on the backward side from the center of a beam spot in a traveling direction (left direction on the drawing surface) thereof. A domain wall energy density $\sigma_1$ in the reproducing layer 91 generally decreases with an increase in temperature to become 0 at a temperature equal to or higher than a Curie temperature. Therefore, in the presence of a temperature gradient, the domain wall energy density $\sigma_1$ is decreased toward a higher temperature side.

Herein, a force $F_1$ represented by the following expression acts on a domain wall present at a position "x" in a medium movement direction (circumferential direction of a disk).

$$F_1 \propto -d\sigma_1/dx$$

The force $F_1$ acts so as to move a domain wall in a direction of lower domain wall energy. In the reproducing layer 91, a domain wall coercive force is smaller and a domain wall mobility is larger compared with those of the other magnetic layers. Therefore, when exchange coupling from the intermediate layer 92 is cut off, a domain wall moves very rapidly in a direction of lower domain wall energy due to the force $F_1$.

Referring to FIG. 9, in a region of the medium before being irradiated with laser light (e.g., a region at a room temperature), three magnetic layers are exchange-coupled to each other, and domains recorded on the recording layer 93 are transferred to the reproducing layer 91. In this state, the domain wall 94 is present between domains having magnetization directions opposite to each other in each layer. In the region 95 that reaches a temperature equal to or higher than the Curie temperature of the intermediate layer 92 due to the irradiation with laser light, magnetization of the intermediate layer 92 is lost, and the exchange coupling between the reproducing layer 91 and the recording layer 93 is cut off. Therefore, a force for holding a domain wall is lost in the reproducing layer 91, and a domain wall is displaced to a higher temperature side due to the force $F_1$ applied to the domain wall. At this time, a domain wall displacement speed is sufficiently higher than that of the medium movement speed. Thus, a domain larger than a domain stored on the recording layer 93 is transferred to the reproducing layer 91.

In a magneto-optical recording medium using the DWDD reproducing system, for the purpose of displacing a domain wall easily, the following is proposed: guide grooves having a rectangular cross-section are formed on a substrate so that domain walls are not generated on the side of the recording tracks, whereby the respective tracks are separated by the grooves. However, even if guide groove having a rectangular cross-section are formed, films actually are accumulated to some degree in stepped portions, and magnetic layers are connected to each other. As a result, magnetic separation cannot be conducted completely, which inhibits the displacement of a domain wall.

SUMMARY OF THE INVENTION

A magneto-optical recording medium of the present invention includes a substrate and a multi-layer film formed on the substrate, the multi-layer film including a first dielectric layer, a domain wall displacement layer, a switching layer, a recording layer, and a second dielectric layer in this order from the substrate side, wherein a Curie temperature of the switching layer is lower than those of the domain wall displacement layer and the recording layer, in a region that reaches a temperature equal to or higher than the Curie temperature of the switching layer due to irradiation with a light beam for reproduction, a domain wall in the domain wall displacement layer moves to a higher temperature side. In the magneto-optical recording medium of the present invention, the magnetic anisotropy of at least one layer selected from the group consisting of the domain wall displacement layer and the recording layer is set lower between recording tracks than on the recording tracks, and on the recording tracks, at least a part of at least one magnetic layer selected from the group consisting of the domain wall displacement layer, the switching layer, and the recording layer is composed of micro-domains having a diameter smaller than a half-width of the light beam for reproduction in a film surface direction.

In the present specification, the term "half-width" refers to the width of a focused light spot with an intensity that is a half of the maximum value in a light spot beam intensity distribution.

In order to produce the magneto-optical recording medium having the above-mentioned configuration, a method for producing a magneto-optical recording medium of the present invention includes: irradiating a light beam to an area between recording tracks of the magneto-optical recording medium while suppressing a magnetic field intensity from the outside to the magneto-optical recording medium to 50 Oe (about 3.98 kA/m) or less, thereby setting the magnetic anisotropy of at least one layer selected from the group consisting of the domain wall displacement layer and the recording layer to be lower between the recording tracks than on the recording track; and forming micro-domains in at least one magnetic layer selected from the group consisting of the domain wall displacement layer, the switching layer, and the recording layer on the recording tracks by heating and cooling involved in irradiation with the light beam.

According to the production method of the present invention, the perpendicular magnetic anisotropy between recording tracks is reduced to weaken a magnetic interaction between the recording track and the land. Simultaneously, minute micro-domains can be formed. If this production method is used, the influence of a leakage magnetic field on the displacement of a domain wall in a magneto-optical recording medium is alleviated, and the medium can be initialized.

The above-mentioned magneto-optical recording medium of the present invention is a novel one provided by the above-mentioned production method, in which satisfactory reproduction characteristics can be obtained even from a signal recorded in a state as it is.

These and other advantages of the present invention will become apparent to those skilled in the art upon reading and understanding the following detailed description with reference to the accompanying figures.

DESCRIPTION OF THE PREFERRED EMBODIMENTS

In a magneto-optical recording medium of the present invention, it is preferable that at least a recording layer is composed of the above-mentioned micro-domains. It is preferable that the diameter of each micro-domain is, for example, 10 nm to 300 nm, and in particular, 100 nm or less.

In the above-mentioned magneto-optical recording medium, recording domains may be formed in a modulation pattern in which the maximum mark length is less than 0.8 µm in a film surface direction in at least a part of the recording layer. The length of each of the recording domains in an extension direction of recording tracks preferably is 0.6 µm or less.

In the magneto-optical recording medium, it is preferable that at least one layer selected from a domain wall displacement layer, a switching layer, and a recording layer is composed of the above-mentioned micro-domains in all the recording tracks. Furthermore, at the center between recording tracks, a film surface perpendicular component of a leakage flux from at least one layer selected from the domain wall displacement layer and the recording layer may be demagnetized.

Although not particularly limited, when the present invention is applied to a magneto-optical recording medium in which pits and grooves are embossed on a substrate and a track pitch of the recording tracks is 0.6 µm or less, satisfactory results can be obtained. Furthermore, the present invention also is suitable for a magneto-optical recording medium in which a recording track is composed of segments containing a pit region and a data region, a wobble pit for sample servo is formed in the pit region, grooves and lands are formed in the data region, and the grooves are used as recording tracks.

According to the production method of the present invention, a micro-domain may have a size having a diameter smaller than a half-width of a light beam for reproduction in a film surface direction, and the above-mentioned microdomain preferably is formed in at least a recording layer. As the light beam for forming micro-domains, for example, a light beam that is focused further than a light beam for reproduction is preferable.

According to the above-mentioned production method, specifically, a light beam focused by an objective lens with a numerical aperture (NA) of 0.65 or more may be radiated to the area between recording tracks. A light beam with a wavelength of 420 nm or less also may be radiated to the area between recording tracks.

Hereinafter, the present invention will be described by way of embodiments with reference to the drawings.

Figure 1:
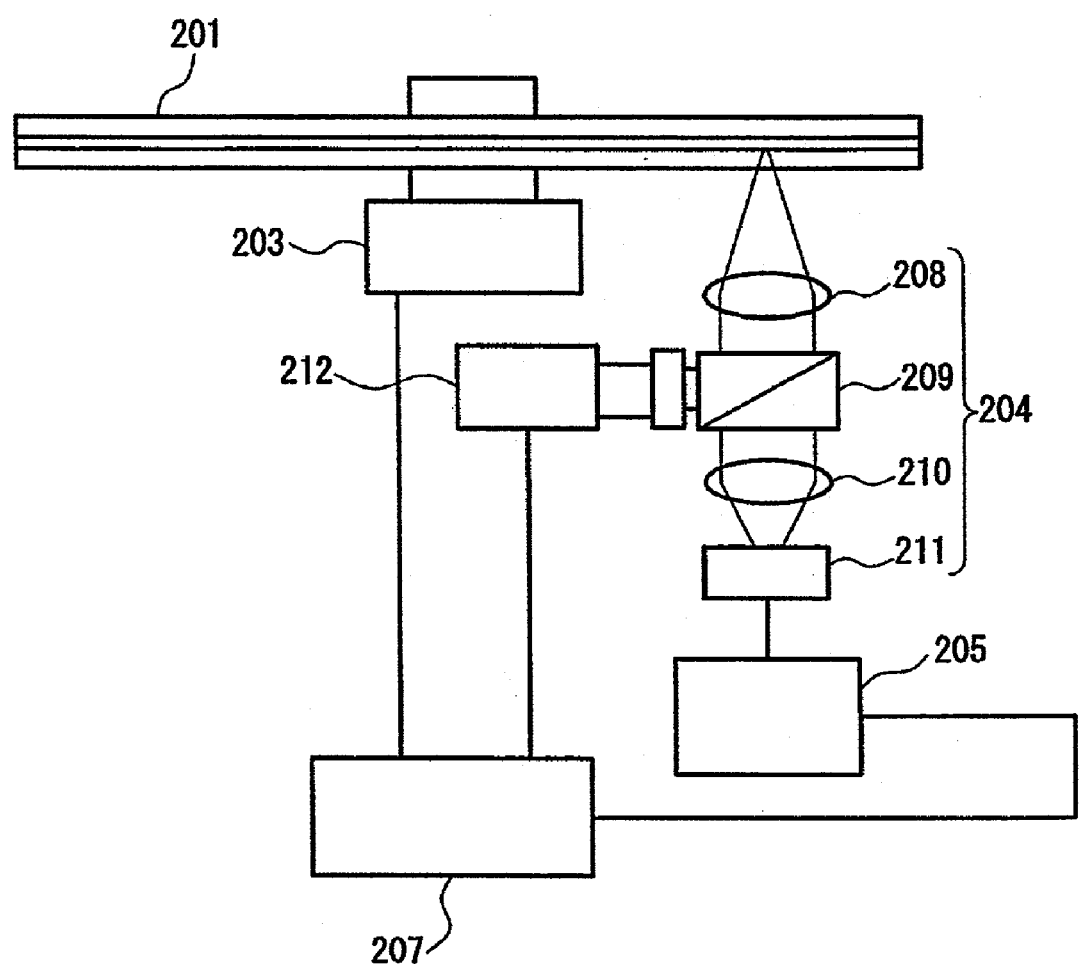
FIG. 1 shows an example of a configuration of an annealing apparatus used for carrying out the present invention.

FIG. 1 shows a configuration of an optical annealing apparatus of one embodiment according to the present invention.

In FIG. 1, reference numeral 201 denotes a magneto-optical recording medium (hereinafter, referred to as a "magneto-optical disk"), and 203 denotes a spindle motor for rotating the magneto-optical disk 201, which is controlled by a control circuit 207. Reference numeral 204 denotes an optical head for subjecting the magneto-optical disk 201 to annealing. The optical head 204 is controlled by a laser driving circuit 205.

As shown in FIG. 1, in the optical head 204, laser light emitted from a semiconductor laser light source (laser diode) 211 is collimated by a collimator lens 210. The parallel light thus obtained is incident upon the objective lens 208 through a polarized beam splitter 209, and focused onto a magnetic layer of the magneto-optical disk 201 by the objective lens 208 to form a light spot. Light reflected from the magneto-optical disk 201 passes through the objective lens 208, and is incident upon the polarized beam splitter 209. The light reflected from the beam splitter 209 is incident upon a detection circuit 212 to detect a control signal for tracking/focusing of the optical head 204.

When annealing is conducted, the optical head 204 is moved to the outermost side or the innermost side of the magneto-optical disk 201. The optical head 204 irradiates the magneto-optical disk 201 with a light spot, and the detection circuit 212 detects a control signal for focusing from light reflected from the magneto-optical disk 201, whereby focusing control is conducted. Then, the control signal for tracking is provided with an offset, whereby a light spot is allowed to scan a track to be annealed. Laser light is provided with a power intensity that achieves a high temperature to such a degree that the perpendicular magnetic anisotropy between recording tracks (information tracks) becomes weak. During annealing, an external magnetic field reaching the magneto-optical disk is suppressed to 50 Oe or less. The external magnetic field is specified exactly by an external magnetic field reaching a recording layer.

Annealing in each embodiment described below was conducted using this apparatus. However, a tracking system, a film configuration, and the like are varied in the respective embodiments.

Embodiment 1

Figure 2:
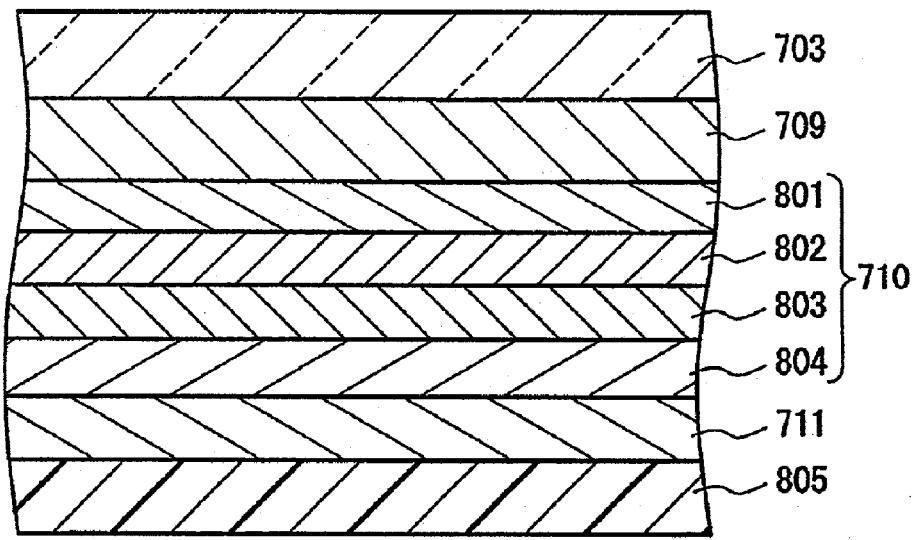
FIG. 2 is a cross-sectional view showing an example of a film configuration of a magneto-optical recording medium of the present invention.
Figure 3:
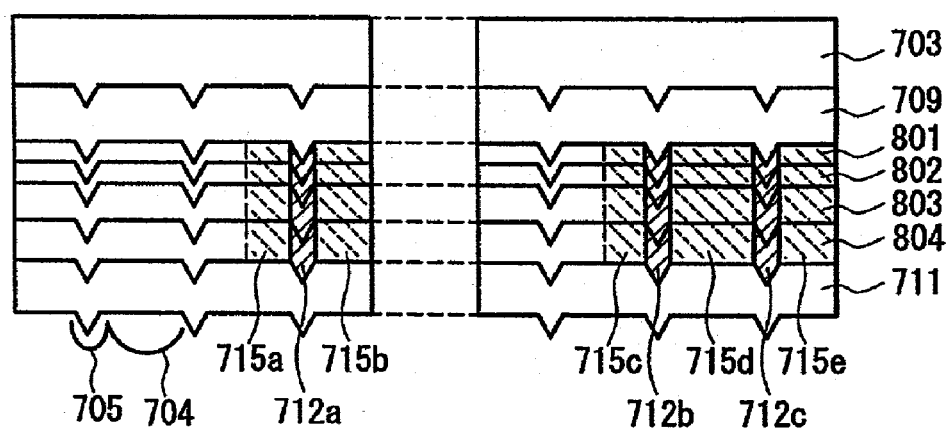
FIG. 3 is a cross-sectional view of a magneto-optical recording medium produced according to one embodiment of the present invention.
Figure 4:
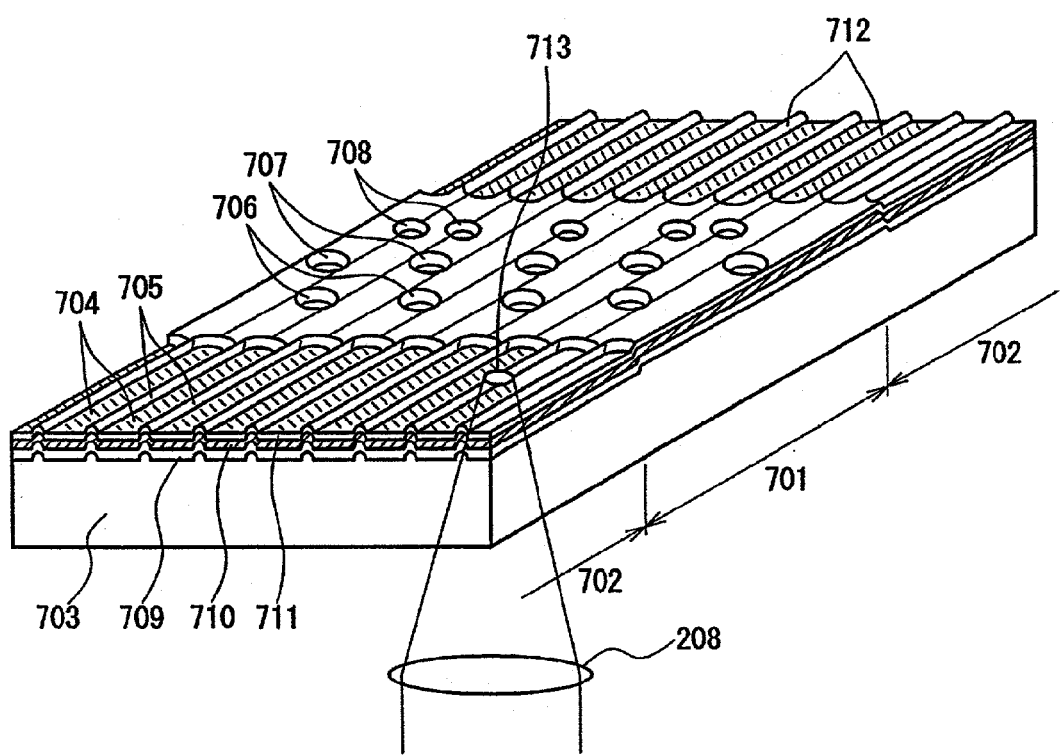
FIG. 4 is a partially cut-away perspective view of a magneto-optical recording medium produced according to one embodiment of the present invention.

Referring to FIGS. 2 to 4, an example of a method for producing a magneto-optical disk will be described.

Reference numeral 703 denotes a disk-shaped substrate, which can be made of polycarbonate, glass, or the like. Herein, the substrate 703 was obtained by injection-molding a polycarbonate material so that first wobble pits 706, second wobble pits 707, and address pits 708 were formed in a pit region 701 for the purpose of using a sampling servo system for tracking during recording/reproducing of information, and guide grooves (groove width: 0.45 μm, land width: 0.19 μm, depth: 50 nm) were formed in a groove region 702 for the purpose of conducting tracking during annealing. In this substrate, the track pitch becomes 0.64 μm. A first dielectric layer 709 and a second dielectric layer 711 can be made of, for example, a dielectric material such as $Si_3N_4$, AlN, $SiO_2$, SiO, ZnS, $MgF_2$, and $Ta_2O_5$ (each material is not limited to a composition determined by a stoichiometric ratio).

Hereinafter, an example of a method for forming each layer will be described.

Respective targets: Si doped with B, GdFeCo, TbFe, Fe, Co, AlTi, Al, Ta, DyFeCo, and Cr were provided to a D.C. magnetron sputtering apparatus. A substrate was fixed with a substrate holder, and then, a chamber was evacuated to a high vacuum state of $1 \times 10^{-5}$ Pa or less with a cryopump. Under this condition, Ar gas was introduced into the chamber until a pressure of 0.3 Pa was obtained. While the substrate was being rotated, the following layers were formed successively. First, a SiNx layer (first dielectric layer) 709 was formed in a thickness of 75 nm. Then, GdFeCoCr (Curie temperature $T_{C1}=280°$ C.) was formed in a thickness of 35 nm as a first magnetic layer (reproducing layer (domain wall displacement layer)) 801. TbFeCo ($T_{C2}=170°$ C.) was formed in a thickness of 5 nm as a second magnetic layer (control layer) 802. TbFeAl ($T_{C3}=150°$ C.) was formed in a thickness of 10 nm as a third magnetic layer (intermediate layer (switching layer)) 803. DyFeCoCr ($T_{C4}=360°$ C.) was formed in a thickness of 60 nm as a fourth magnetic layer (recording layer) 804. TaOx was formed in a thickness of 50 nm as a second dielectric layer 711. During formation of the SiNx layer $N_2$ gas was introduced in addition to Ar gas, and during formation of the TaOx layer, $O_2$ gas was introduced in addition to Ar gas, whereby the SiNx layer and the TaOx layer were formed by D.C. reactive sputtering. Each magnetic layer was formed by applying a D.C. power to each target. Furthermore, the dielectric layer 711 was coated with a UV-curable resin, and the resin was cured to form a protective coating 805. The protective coating 805 was formed after annealing (described later).

A driving force for moving a domain wall in the reproducing layer 801 utilizes a temperature gradient on the forward side of laser light. Although a temperature gradient formed on the backward side of laser light is more gentle than that on the forward side thereof, a domain wall driving force is induced. The displacement of a domain wall on the backward side of laser light becomes noise of a reproducing signal. However, when the control layer 802 is provided as one of the magnetic layers 710 to allow an interface domain wall between the reproducing layer 801 and the recording layer 804 to be maintained easily, the displacement of a domain wall on the backward side of laser light can be suppressed. As the control layer 802, a magnetic layer having a Curie temperature higher than that of the intermediate layer 803 and lower than that of the reproducing layer 801 is preferable.

Annealing in the present embodiment will be described with reference to a schematic diagram of the annealing (initializing) apparatus shown in FIG. 1. Herein, the laser diode 211 with a wavelength of 415 nm is used. Laser light emitted from the laser diode 211 passes through the polarized beam splitter 209, and is focused by the objective lens (NA: 0.75) 208 to form a laser spot. At this time, a magneto-optical disk is set so as not to be supplied with an external magnetic field exceeding 50 Oe. In this initializing apparatus, laser light with a wavelength of 415 nm is used.

Therefore, the diameter of a laser spot 713 (FIG. 4) formed by condensing the laser light by the objective lens 208 becomes small (i.e., 295 nm).

By operating a tracking servo with the use of primary diffracted light from a land, the laser spot 713 was allowed to scan a land 705 with a width of 0.19 µm. Light reflected from the laser spot 713 is detected by the detection circuit 212 via the objective lens 208 and the polarized beam splitter 209. A focus actuator is driven based on the detected signal so that the diameter of the laser spot 713 does not change significantly.

A diameter "r" (nm) of the laser spot and a width "lw" (nm) of the land preferably are set so as to satisfy the following relationship.

$$lw < r < lw + 200 \text{ nm}$$

Thus, the land 705 in the groove region (data region) 702 was irradiated with the above-mentioned high-output laser light. At this time, the laser spot was moved at an appropriate linear velocity with respect to the magneto-optical disk 201, using the spindle motor 203 of the magneto-optical disk 201 and a mechanism (not shown) for moving the laser spot in a radial direction of the magneto-optical disk 201. Due to the irradiation with laser light, initialization for forming annealing regions 712a to 712c was conducted. In the annealing regions 712a to 712c, the reproducing layer 801, the control layer 802, the intermediate layer 803, and the recording layer 804 were heated, and the magnetization thereof became different from that of the peripheral region, whereby magnetic coupling is cut off. In the case where an output laser power of the laser diode 211 was 10 mW, the width of the annealing region 712 was allowed to be set at 0.20 µm at a linear velocity of 15 m/sec.

Furthermore, when the laser spot 713 is allowed to scan the land 705, a part of the magnetic layer reaches a Curie temperature in an adjacent groove 704. Therefore, when the laser spot 713 passes and magnetization occurs during the process of cooling, due to the magnetic field leaked from this magnetization, opposite magnetization occurs in a portion to be cooled subsequently. This cooling process is repeated successively. Therefore, by allowing the laser spot 713 to scan the land 705 under the condition of being substantially shielded from at least an external magnetic field, a microdomain with a size equal to or smaller than a laser spot diameter of laser light for reproduction can be formed in the recording layer of the groove that is a recording track in the data region. Thus, micro-domain formation regions 715a to 715e are formed.

By annealing under the above-mentioned condition, as shown in the figure, it was possible to set the entire groove 704 to be a micro-domain formation region. Assuming that the diameter of the laser spot to be radiated for reproduction is set to be a half-width of an annealing laser light spot, in the case of using, for example, a laser with a wavelength of 660 nm and NA of 0.65, the half-width thereof becomes 580 nm, whereas the diameter of a micro-domain is formed smaller than the half-width.

It may not be necessary to shield against an external magnetic field completely during annealing. However, it is preferable that an external magnetic field is smaller than a leakage magnetic field from a cooled portion, and specifically, the external magnetic field may be 50 Oe or less.

Shielding of an external magnetic field may be conducted depending upon an apparatus or the like to be used. For example, a shielding plate or a shielding cover is provided with respect to a site such as an actuator and a motor in which a magnetic field is generated. Alternatively, by applying a magnetic field of opposite polarity from the outside, it may be possible to shield against a magnetic field on the recording layer.

By adjusting a laser spot and a disk movement speed (linear velocity by rotation), a change in temperature of a recording layer in the course of increase in temperature and cooling are controlled, whereby a leakage magnetic field from a peripheral recording layer can be changed, and the size of a micro domain in the recording layer of the groove 704 can be controlled.

Figure 5:
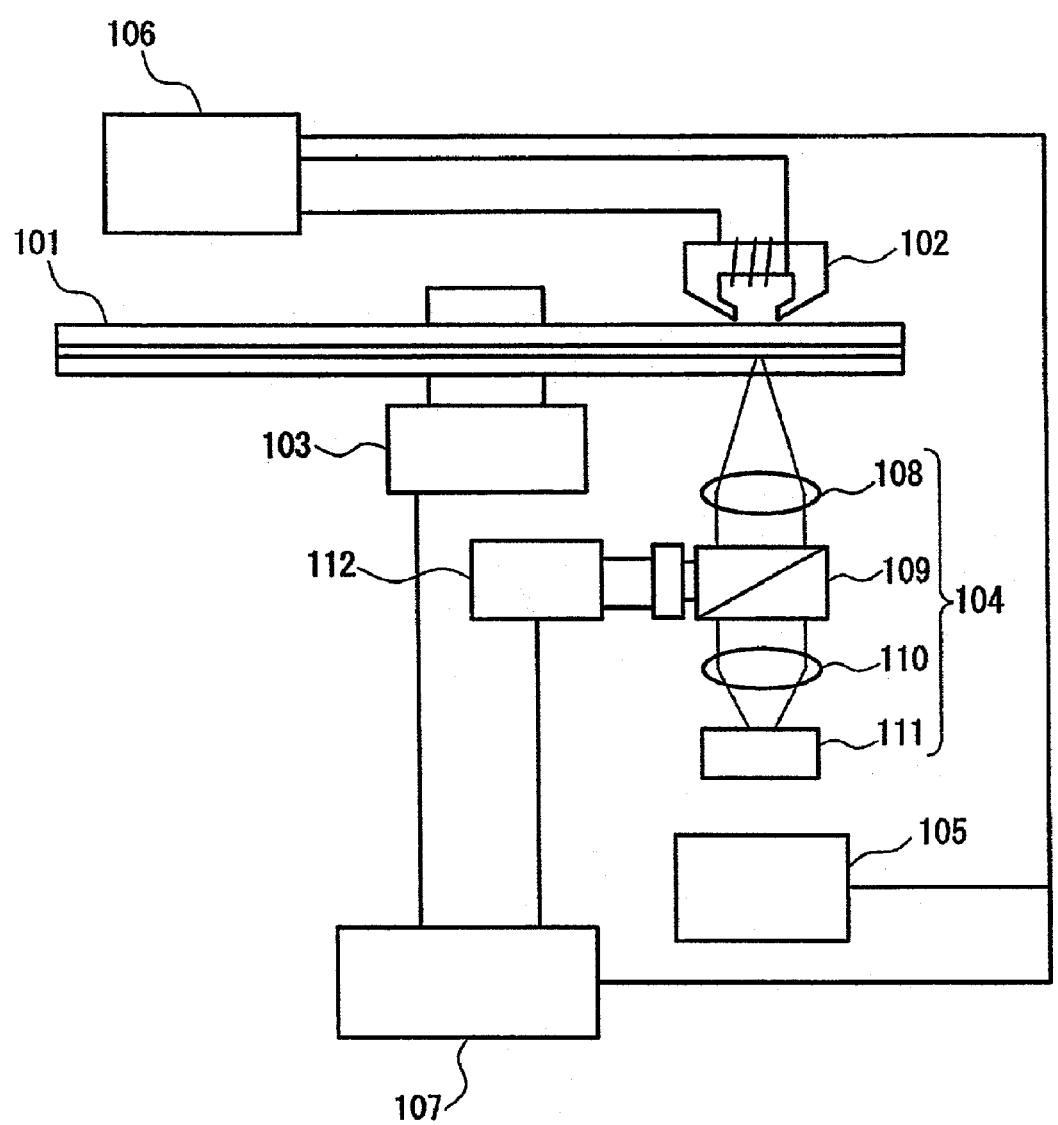
FIG. 5 shows an example of a configuration of an evaluating apparatus of a magneto-optical recording medium.

FIG. 5 shows a configuration of an evaluating apparatus used for evaluating the recording/reproducing characteristics of a magneto-optical disk. In this evaluating apparatus, laser light emitted from a semiconductor laser light source (laser diode) 111 with a wavelength of 650 nm was focused by an objective lens 108 with a NA of 0.65, whereby characteristics were evaluated. Recording was conducted as follows. A bias magnetic field of 350 Oe was applied at a linear velocity of 1.5 m/sec. and a power of 2.5 mW by magnetic field modulation recording, whereby a recording mark (recording domain) with the minimum mark length of 0.15 µm in a film surface direction was formed in the recording layer. Herein, initialization was conducted by annealing. Therefore, grooves in the data region are not deleted before recording.

As described above, a disk A was produced by conducting annealing while suppressing an external magnetic field reaching a magneto-optical disk to 30 Oe or less, and a disk B was produced by conducting annealing without shielding against an external magnetic field (the external magnetic field at this time was 80 Oe). Both the disks A and B were evaluated for characteristics. In the disk B, due to the influence of a leakage magnetic field from an adjacent track, the window jitter was 12%. In the disk A, the window jitter was 10% or less. Thus, an excellent SN ratio was obtained when annealing was conducted while shielding against a leakage magnetic field.

In the present embodiment, a magnetic layer of a magneto-optical disk was shielded from an external magnetic field by a magnetic field shielding member disposed in the vicinity of the disk. If a leakage magnetic field from an actuator of an optical head is set at 50 Oe or less, the same effects can be obtained by adjusting a spot diameter and intensity of laser light to be radiated to the magnetic layer, and the linear velocity of rotation movement of a disk. More specifically, an actuator is shielded magnetically by a shielding member. Alternatively, an external magnetic field on a recording layer surface effectively may be cancelled by providing a permanent magnet of opposite polarity to that of the external magnetic field.

As described above, in the present embodiment, a magneto-optical disk with a high recording density, which is initialized by formation of micro-domains, can be obtained in a short period of time. In this magneto-optical disk, perpendicular magnetic anisotropy on the land is weakened by annealing, and a magnetic interaction between the recording track and the land becomes weak. Therefore, an influence of a leakage magnetic field from an adjacent groove is alleviated.

A magneto-optical disk is not limited to the configuration shown in the figure. A heat conduction adjusting layer for adjusting the sensitivity of the recording layer 804 further may be provided between the second dielectric layer 711 and the protective coating 805. As the heat conduction adjusting layer, a metal film made of aluminum, gold, or the like can be used. In general, the thickness of the heat conduction adjusting layer is about 50 nm to 500 nm.

Embodiment 2

Figure 6:
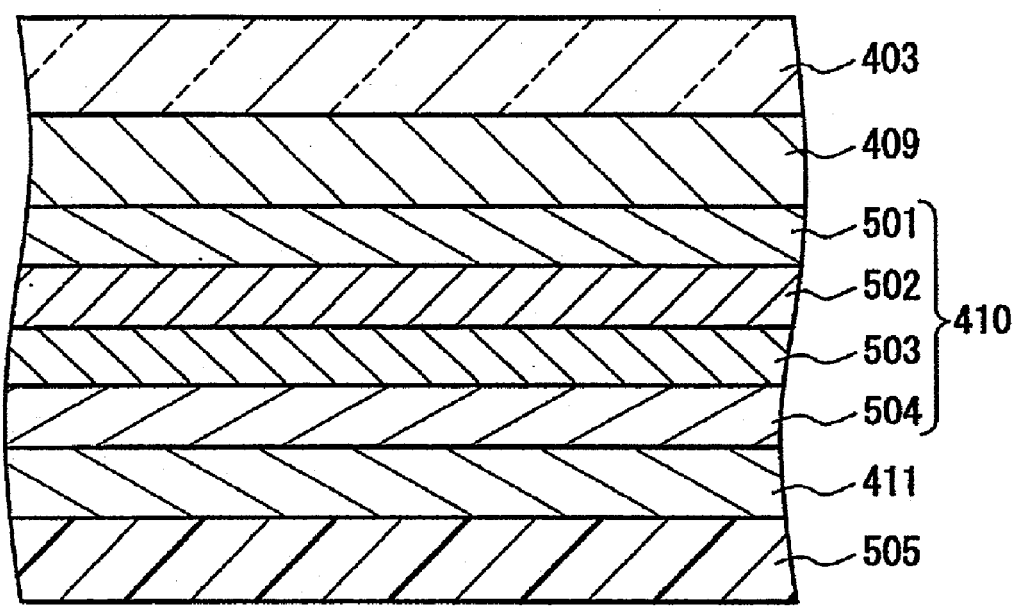
FIG. 6 is a cross-sectional view showing an example of a film configuration of the magneto-optical recording medium of the present invention.
Figure 7:
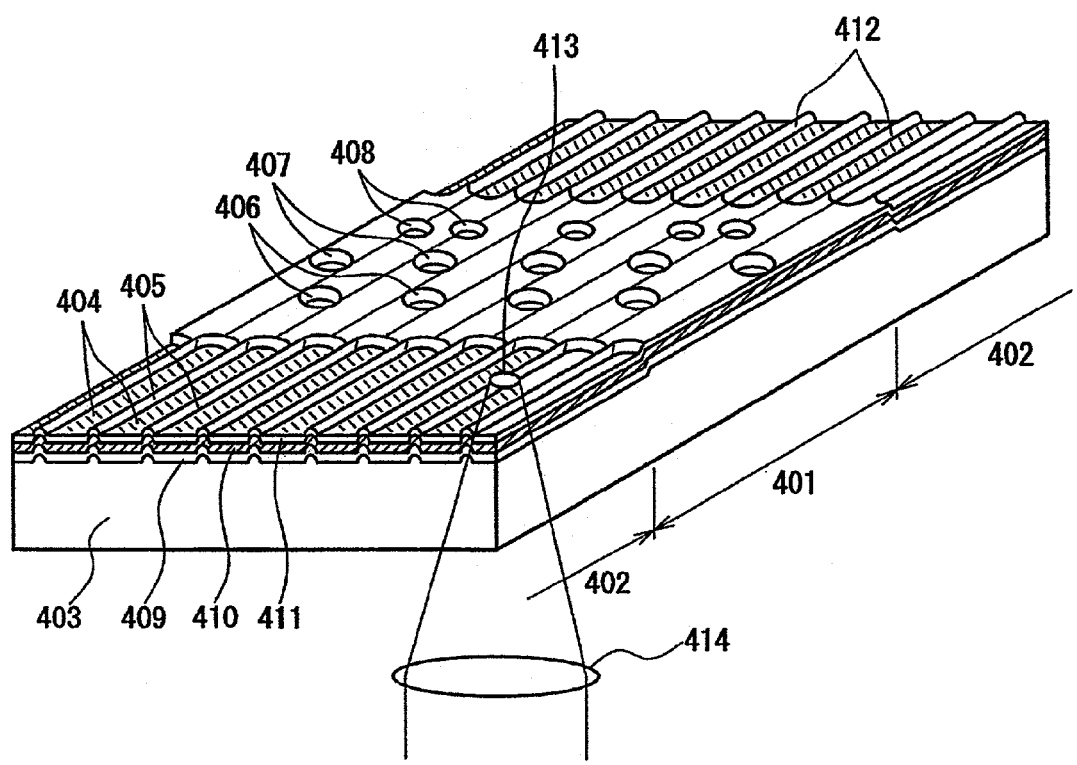
FIG. 7 is a partially cut-away perspective view showing a magneto-optical recording medium produced according to one embodiment of the present invention.

FIG. 6 shows a film configuration of a magneto-optical disk of Embodiment 2, and FIG. 7 is a partially cut-away perspective view thereof. Reference numeral 403 denotes a disk-shaped substrate, which can be made of polycarbonate, glass, or the like. Herein, a substrate was obtained by injection-molding a polycarbonate material so that first wobble pits 406, second wobble pits 407, and address pits 408 were formed in a pit region 401 for the purpose of using a sampling servo system for tracking during recording/reproducing of information, and guide grooves (groove width: 0.5 μm, land width: 0.15 μm, depth: 55 nm) were formed in a groove region (data region) 402 for the purpose of conducting tracking during annealing. A first dielectric layer 409 and a second dielectric layer 411 can be made of the same dielectric materials as the above.

Hereinafter, an example of a method for forming each layer will be described.

Respective targets: Si doped with B, GdFeCo, TbFe, Fe, Co, AlTi, Al, ZnS, DyFeCo, and Cr were provided to a D.C. magnetron sputtering apparatus. A substrate was fixed with a substrate holder and then, a chamber was evacuated to a high vacuum state of $1 \times 10^{-5}$ Pa or less by a cryopump. Under this condition, Ar gas was introduced into the chamber until a pressure of 0.3 Pa was obtained. While the substrate was being rotated, the following layers were formed successively. First, a SiNx layer (first dielectric layer) 409 was formed in a thickness of 80 nm. Then, GdFeCo (Curie temperature $T_{C1}=290°$ C.) was formed in a thickness of 30 nm as a first magnetic layer (reproducing layer (domain wall displacement layer)) 501. TbFeCo ($T_{C2}=180°$) was formed in a thickness of 5 nm as a second magnetic layer (control layer) 502. TbFeAl ($T_{C3}=160°$ C.) was formed in a thickness of 10 nm as a third magnetic layer (intermediate layer (switching layer)) 503. TbDyFeCo ($T_{C4}=380°$ C.) was formed in a thickness of 100 nm as a fourth magnetic layer (recording layer) 504. ZnS was formed in a thickness of 50 nm as a second dielectric layer 411. During formation of the SiNx layer, $N_2$ gas was introduced in addition to Ar gas, whereby the SiNx layer was formed by D.C. reactive sputtering. Each magnetic layer was formed by applying a D.C. power to each target: GdFeCo, TbFe, Fe, Co, DyFeCo, and Al. A protective coating 505 was formed by annealing the lands, coating the lands with UV-curable resin, and curing the resin.

Annealing of the present embodiment will be described with reference to FIG. 1. Herein, laser light emitted from the laser diode 211 with a wavelength of 405 nm passes through the polarized beam splitter 209, and is focused by the objective lens (NA: 0.75) 208 to form a laser spot. In the initializing apparatus, laser light with a wavelength of 405 nm is used. Therefore, the diameter of a laser spot 413 formed by condensing laser light by the objective lens 208 becomes small (i.e., 300 nm).

By operating a tracking servo with the use of primary diffracted light from a land, the laser spot 413 was allowed to scan a land 405 with a width of 0.15 μm. light reflected from the laser spot 413 is detected by the detection circuit 212 via the objective lens 208 and the polarized beam splitter 209. A focus actuator is driven based on the detected signal so that the diameter of the laser spot 413 does not change significantly.

Thus, the land 405 in the groove region (data region) 402 was irradiated with the above-mentioned high-output laser light. At this time, the laser spot is moved at an appropriate linear velocity with respect to the magneto-optical disk 201, using the spindle motor 203 of the magneto-optical disk 201 and a mechanism (not shown) for moving the laser spot in a radial direction of the magneto-optical disk 201. Due to the irradiation with laser light, initialization for forming annealing regions 412 is conducted. In the annealing regions 412, the reproducing layer 501, the control layer 502, the intermediate layer 503, and the recording layer 504 were heated, and the magnetization thereof became different from that of the peripheral region, whereby magnetic coupling is cut off. In the case where an output laser power of the laser diode 211 was 20 mW, the width of the annealing region 412 was allowed to be set at 0.16 μm at a linear velocity of 30 m/sec.

Furthermore, when the laser spot 413 is allowed to scan the land 405, the entire magnetic layer of the adjacent groove 404 reaches a Curie temperature. By controlling temperature characteristics of magnetization of the recording layer, micro-domains are formed in the entire groove region 402 (recording tracks) in the same way as in Embodiment 1.

Herein, a disk C was produced by conducting the above-mentioned annealing while shielding against an external magnetic field to suppress it at a position of the recording layer to 50 Oe or less. This could be accomplished by disposing a permanent magnet of a magnetic field of opposite polarity to that of the external magnetic field so as to cancel the external magnetic field on the recording layer surface. A disk D was produced by conducting the annealing without shielding against an external magnetic field. The characteristics of both of the disks C and D were evaluated.

In the evaluating apparatus, a light source with a wavelength of 650 nm was used, and light was focused by an objective lens (NA: 0.65). A bias magnetic field of 300 Oe was applied at a linear velocity of 1.5 m/sec. and a power of 2.5 mW by magnetic field modulation recording, whereby a recording mark (recording domain) with the minimum mark length of 0.2 μm in a film surface direction was formed on the recording layer. In the disk C, a CN ratio of 42 dB was obtained. In the disk D, a CN ratio of 36 dB was obtained at an external magnetic field of 100 Oe. However, even in the disk D, by disposing a permanent magnet so as to be opposed to an actuator to cancel a magnetic field of the actuator, an external magnetic field at a position of the recording layer became 50 Oe, and a CN ratio became 40 dB.

Embodiment 3

Figure 8A:
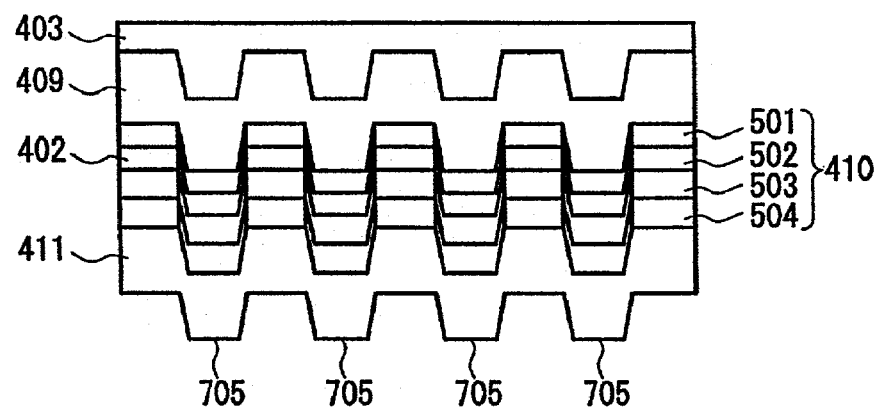
FIGS. 8A and 8B are an enlarged cross-sectional view and an enlarged plan view of a magneto-optical recording medium produced according to one embodiment of the present invention.
Figure 8B:
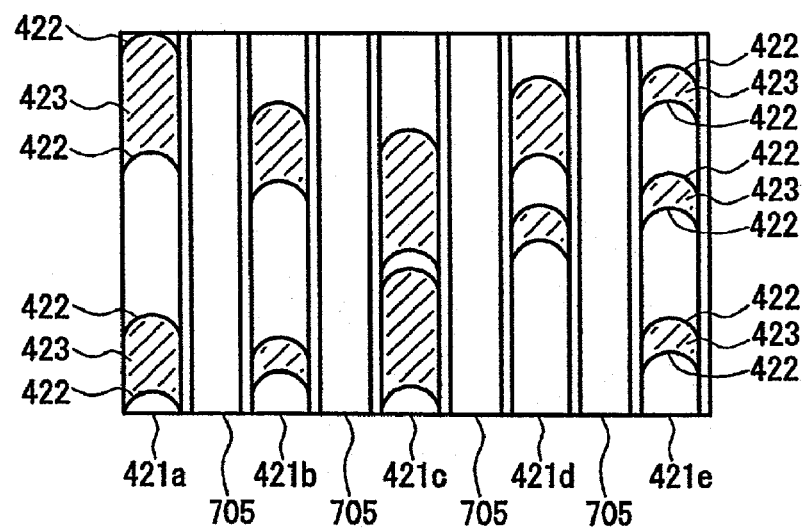
Figure 9:
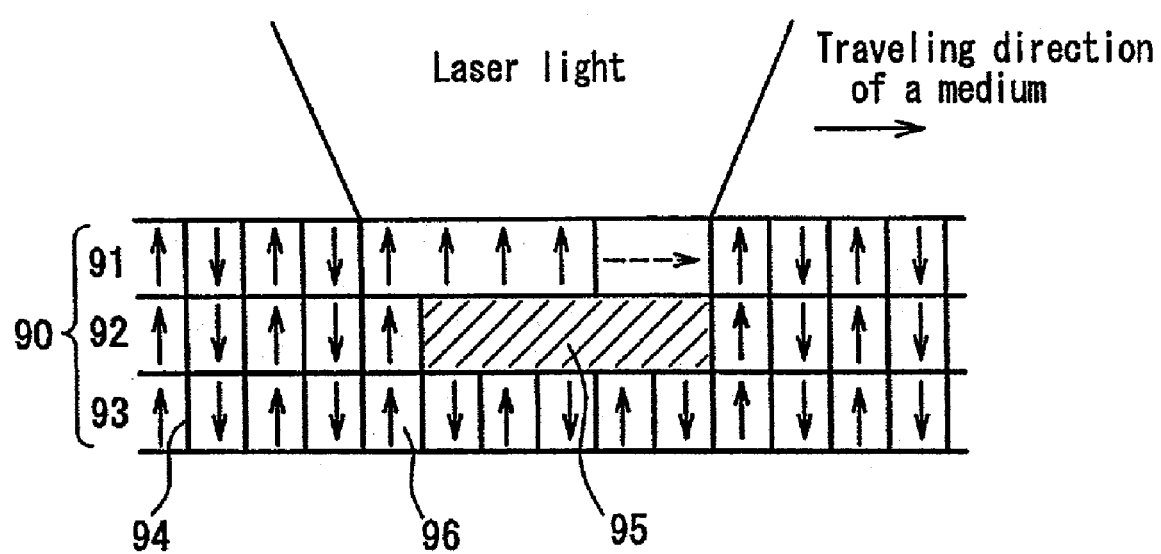
FIG. 9 is a cross-sectional view showing an example of a conventional magneto-optical recording medium used in a DWDD reproducing system.

FIG. 8A is an enlarged cross-sectional view taken along a diameter direction, showing a configuration of a recording domain of a magneto-optical disk after annealing in the present embodiment, and FIG. 8B is an enlarged plan view thereof. Herein, a substrate 403 was obtained by injection-molding a polycarbonate material so that guide grooves (groove width: 0.4 μm, land width: 0.2 μm, depth: 75 nm) were formed in a groove region 402. On the substrate 403, the following layers were formed successively in the same way as the above. First, a SiN layer (first dielectric layer) 409 was formed in a thickness of 80 nm. Then, GdFeCo (Curie temperature $T_{C1}=290°$ C.) was formed in a thickness of 30 nm as a first magnetic layer (reproducing layer) 501. TbFeCo ($T_{C2}=180°$) was formed in a thickness of 5 nm as a second magnetic layer (control layer) 502. TbFeAl ($T_{C3}=160°$ C.) was formed in a thickness of 10 nm as a third magnetic layer (intermediate layer) 503. TbFeCo ($T_{C4}=400°$ C.) was formed as a fourth magnetic layer (recording layer) 504. ZnS was formed in a thickness of 50 nm as a second dielectric layer 411.

The magneto-optical disk was initialized by annealing in the same way as described above. Furthermore, recording marks were formed in grooves to be recording tracks. The recording marks were formed by applying a bias magnetic field of 300 Oe at a linear velocity of 1.5 m/sec., a power of 2.0 mW, and a recording power of 3.0 mW by magnetic field modulation recording, using a light source with a wavelength of 650 nm and an objective lens with a NA of 0.65.

As shown in FIG. 8B, recording marks 423 are formed on recording tracks 421a to 421e between annealed lands 705. A domain wall 422 of a recording domain is present at a boundary of recording marks. In the domain wall, the magnetization direction is twisted locally.

In the recording tracks 421a to 421e, as described in the above-mentioned embodiment, the domain wall 422 of the reproducing layer 501 is moved during reproduction to enlarge a small mark, whereby a satisfactory signal can be obtained. In order to move the magnetic wall 422 stably at a high speed, it is desirable to set further preferable conditions.

One condition is an influence of a leakage magnetic field generated from a track adjacent to a recording track. Although a magnetic effect with respect to an adjacent track is weakened by irradiation with a high-output laser during annealing, the magnetic characteristics of a track subjected to annealing are not eliminated completely. In particular, in a DWDD magnetic layer 410, a magnetic film having a Curie temperature higher than those of the other magnetic layers and a large perpendicular magnetic anisotropy is used for the recording layer 504. Therefore, even after a high output laser is radiated, it is difficult to eliminate perpendicular magnetic anisotropy of the recording layer 504 completely. If annealing for completely eliminating perpendicular magnetic anisotropy of the recording layer 504 is conducted in a track adjacent to a recording track, the magnetic properties of the recording tracks 421a to 421e also are degraded, so that a satisfactory reproducing signal cannot be obtained.

A leakage magnetic field from an adjacent track to the reproducing layer 501 of a recording track influences the movement of domain walls in the reproducing layer 501, in the case where the reproducing layer 501 is not exchange-coupled to the recording layer 503. However, in a configuration in which micro-domains with a half-width or less of a light beam for reproduction are formed at least in the recording layer 503, in a configuration in which recording marks of a 1–7 RLL (Run Length Limited) modulation signal are formed, or in a configuration of a magnetic wall in which a small domain with the maximum mark length of the 1–7RLL modulation signal of 0.8 μm or less is formed, an influence on a reproducing signal is small. Furthermore, it is possible to substantially eliminate an influence of a leakage magnetic field generated in a recording track and a satisfactory DWDD signal can be obtained. Herein, the 1–7 RLL modulation signal refers to a signal that is converted by a (1–7) code rule in which a minimum inversion interval $T_{min}$ and a maximum inversion interval $T_{max}$ are finite.

Even in the present embodiment, in the same way as in Embodiment 1, annealing of the lands 405 is conducted while shielding against an external magnetic field, whereby a leakage magnetic field with respect to the recording track 421 can be suppressed. Furthermore, by increasing a linear velocity of a laser spot during annealing, the diameter of micro-domains in at least one layer of the domain wall displacement layer and the recording layer can be decreased.

Thus, in Embodiment 3, an initialized magneto-optical disk with a high recording density can be obtained in a short period of time, in which a further satisfactory DWDD signal is obtained.

As described above, according to the present invention, magnetic coupling between recording tracks is cut off effectively, whereby an influence of a leakage magnetic field can be alleviated, and simultaneously, micro-domains can be formed to conduct initialization. According to the present invention, a magneto-optical recording medium with a high recording density, a large signal level, and low noise can be obtained. Furthermore, by controlling a mark length in a region of the recording layer where micro-domains are formed or the size of domain width, it is possible to decrease a leakage magnetic field of an adjacent track According to the present invention, by forming micro-domains over the entire surface of a disk, it is possible to omit an initialization process of a data region.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for producing a magneto-optical recording medium including a substrate and a multi-layer film formed on the substrate, the multi-layer film including a first dielectric layer, a domain wall displacement layer, a switching layer, a recording layer, and a second dielectric layer in this order from the substrate side, wherein a Curie temperature of the switching layer is lower than those of the domain wall displacement layer and the recording layer, and in a region that reaches a temperature equal to or higher than the Curie temperature of the switching layer due to irradiation with a light beam for reproduction, a domain wall in the domain wall displacement layer moves to a higher temperature side, the method comprising:
   irradiating a light beam to an area between recording tracks of the magneto-optical recording medium while suppressing a magnetic field intensity from the outside to the magneto-optical recording medium to 50 Oe or less, thereby setting magnetic anisotropy of at least one layer selected from the group consisting of the domain wall displacement layer and the recording layer to be lower between the recording tracks than on the recording tacks; and
   forming micro-domains in at least one magnetic layer selected from the group consisting of the domain wall displacement layer, the switching layer, and the recording layer on the recording tracks by heating and cooling involved in irradiation with the light beam.

2. A method for producing a magneto-optical recording medium according to claim 1, wherein micro-domains having a diameter smaller than a half-width of the light beam for reproduction are formed in the film surface direction.

3. A method for producing a magneto-optical recording medium according to claim 1, wherein in at least the recording layer, micro-domains having a diameter smaller than a half-width of the light beam for reproduction are formed in the film surface direction.

4. A method for producing a magneto-optical recording medium according to claim 1, wherein a light beam focused by an objective lens with a numerical aperture of 0.65 or more is radiated to an area between the recording tracks.

5. A method for producing a magneto-optical recording medium according to claim 1, wherein a light beam with a wavelength of 420 nm or less is radiated to an area between the recording tracks.

* * * * *

UNITED STATES PATENT AND TRADEMARK OFFICE
CERTIFICATE OF CORRECTION

| | | |
|---|---|---|
| PATENT NO. | : 7,126,886 B2 | Page 1 of 1 |
| APPLICATION NO. | : 10/123894 | |
| DATED | : October 24, 2006 | |
| INVENTOR(S) | : Murakami et al. | |

It is certified that error appears in the above-identified patent and that said Letters Patent is hereby corrected as shown below:

Column 12, line 44(claim 1): "tacks" should read --tracks--.

Signed and Sealed this

Fifteenth Day of May, 2007

JON W. DUDAS
*Director of the United States Patent and Trademark Office*